US006905754B2

(12) United States Patent
Jing et al.

(10) Patent No.: US 6,905,754 B2
(45) Date of Patent: *Jun. 14, 2005

(54) OPTICAL ELEMENTS COMPRISING FLUOROCHEMICAL SURFACE TREATMENT

(75) Inventors: Naiyong Jing, Woodbury, MN (US); Zhongxing Zhang, Woodbury, MN (US); Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 123 days.

This patent is subject to a terminal disclaimer.

(21) Appl. No.: 10/132,966

(22) Filed: Apr. 26, 2002

(65) Prior Publication Data

US 2003/0203186 A1 Oct. 30, 2003

(51) Int. Cl.[7] .............................. B32B 1/00; B32B 5/16; C08K 9/04; G03B 21/06
(52) U.S. Cl. ....................... 428/142; 428/144; 428/422; 428/403; 428/406; 428/323; 428/325; 428/327; 359/453; 523/200
(58) Field of Search ......................... 359/453; 523/200; 428/141, 142, 144, 421, 422, 403, 404, 405, 406, 407, 323, 325, 327, 331

(56) References Cited

U.S. PATENT DOCUMENTS

| | | |
|---|---|---|
| 2,567,011 A | 9/1951 | Diesslin et al. |
| 2,606,206 A | 8/1952 | Guenthner |
| 2,642,416 A | 6/1953 | Ahibrecht et al. |
| 2,662,835 A | 12/1953 | Reid |
| 2,666,797 A | 1/1954 | Olson |
| 2,706,733 A | 4/1955 | Reid |
| 2,727,923 A | 12/1955 | Husted |
| 2,732,398 A | 1/1956 | Brice et al. |
| 2,759,019 A | 8/1956 | Brown et al. |
| 2,764,602 A | 9/1956 | Ahlbrecht |
| 2,803,615 A | 8/1957 | Ahlbrecht |
| 2,803,656 A | 8/1957 | Ahlbrecht |
| 2,809,990 A | 10/1957 | Brown |
| 2,841,573 A | 7/1958 | Ahlbrecht |
| 2,934,450 A | 4/1960 | Brown |
| 3,222,204 A | 12/1965 | Weber et al. |
| 3,666,530 A | 5/1972 | Aue et al. |
| 3,922,381 A | 11/1975 | Datta |
| 4,025,709 A | 5/1977 | Blaise et al. |
| 4,140,709 A | 2/1979 | Szur |
| 4,380,618 A | 4/1983 | Khan et al. |
| 4,713,295 A | 12/1987 | Laroche |
| 5,688,884 A | 11/1997 | Baker et al. |
| 6,153,671 A | 11/2000 | Schleifstein |
| 6,632,508 B1 * | 10/2003 | Pellerite et al. ............. 428/142 |

FOREIGN PATENT DOCUMENTS

| | | |
|---|---|---|
| EP | 0 433 070 | 6/1991 |
| SU | 1019798 | 6/1981 |
| WO | WO 99/37720 | 7/1999 |
| WO | WO 01/30873 | 5/2001 |

OTHER PUBLICATIONS

Forafac 1033D, Performant Fluorinated Surfactants for Multiple Applications, Atofina Chemicals, Inc. 04/97, (Material Safely Data Sheet issued Jun. 16, 2000) 9 pages total.
Product Information: "Krytox®157 FS Fluorinated Oil," Du Pont, Sep. 29, 2000.
Journal of Fluorine Chemistry, 93, 1–25 (1999).
Forafac 1033D, Performant Fluorinated Surfactants for Multiple Applications, Atofina Chemicals, Inc. 9 pages, Jun. 16, 2000.

* cited by examiner

Primary Examiner—Monique R. Jackson
(74) Attorney, Agent, or Firm—Carolyn A. Fischer

(57) ABSTRACT

The present invention relates to optical elements comprising fluorochemical surface treatments having the general structure $Rf\text{-}[G]_m(CH_2)_n\text{—}X$ wherein Rf is a fluorinated alkyl group, G is a divalent linking group selected from oxygen (—O—) and sulfonamido (—$SO_2R$—), m is an integer ranging from 0 to 1, n is an integer ranging from 1 to 24, and X is polar group or polar group containing radical. The invention further relates to materials such as retroreflective sheetings, pavement markings and beaded projection screens comprising a binder and the surface treated optical elements.

17 Claims, No Drawings

OPTICAL ELEMENTS COMPRISING FLUOROCHEMICAL SURFACE TREATMENT

FIELD OF THE INVENTION

The present invention relates to optical elements comprising fluorochemical surface treatments having the general structure Rf-[G]$_m$(CH$_2$)$_n$—X wherein Rf is a fluorinated alkyl group, G is a divalent linking group selected from oxygen (—O—) and sulfonamido (—SO$_2$R—), m is an integer ranging from 0 to 1, n is an integer ranging from 1 to 24, and X is polar group or polar group containing radical. The invention further relates to materials such as retroreflective sheetings, pavement markings and beaded projection screens comprising a binder and the surface treated optical elements.

BACKGROUND OF THE INVENTION

Beaded projection display screens, retroreflective sheeting used in the manufacture of roadway signs, and retroreflective paints typically include optical elements adhered through the use of a binder. In the case of beaded projection display materials, the optical elements are microscopic glass beads that act as lenses to collect projected light from the rear of the screen and focus it to relatively small spots, near the surfaces of the microspheres. The foci are approximately in the areas where the optical elements contact a front support layer. In other retroreflective materials, the optical elements act as lenses which focus the light onto a reflector (metal mirror of diffusely reflecting pigment) and once the light has been reflected off the reflector the microspheres again act as lenses to resend the light back toward the incoming light source. In order to contribute the desired retroreflective property, however, it is important that a layer of glass microspheres be present on the surface of the binder layer.

As discussed in U.S. Pat. No. 3,222,204, ordinary glass beads tend to sink into the uncured liquid binder layer. In instances wherein the individual beads are not entirely submerged, the optical properties of the bead can also be impaired by the binder wetting out the bead surface and spreading on the exposed bead surface. To address this problem, U.S. Pat. No. 3,222,204 teaches coating the glass beads with a thin surface coating of an oleophobic fluorocarbon-sizing agent. At column 5, lines 61–75, this reference states that, "Aqueous treating solutions of fluorocarbon chromium coordination complexes are preferred and are described in U.S. Pat. No. 2,662,835 (Dec. 15, 1953) and U.S. Pat. No. 2,809,990 (Oct. 15, 1957) and U.S. Pat. No. 2,934,450 (Apr. 26, 1960). The complex may be made by reacting chromyl chloride with a fluorocarbon monocarboxylic acid (having a highly fluorinated terminal chain or tail containing 4 to 10 carbon atoms) in an isopropanol vehicle that serves as both a solvent and reducing agent, the chromium to acid mole ratio being in the range of 2:1 to 5:1. The resultant green-colored isopropanol solution of the complex is diluted with water at the time of use. The fluorocarbon acid preferably has 6 to 8 fully fluorinated (perfluorinated) carbon atoms in the terminal fluorocarbon chain or tail." Specific working examples include chromium coordination complexes of perfluorooctanoic acid and N-ethyl-N-perfluorooctanesulfonyl glycine.

U.S. Pat. No. 4,713,295 teaches coating glass beads with a mixture of substances. The mixture comprises a first substance which if used alone would tend to make the beads hydrophobic while leaving them oleophilic and a second substance which if used alone would tend to make the beads both hydrophobic and oleophobic. "For the best results, it is preferred to use a second substance which is an anionic fluorocarbon compound, and optimally, said second substance is a fluoro-alkyl-sulphonate, for example a fluoro-alkyl-sulphonate in which the alkyl has a long chain (C$_{14}$ to C$_{18}$)." (See Column 4, lines 8–13). The exemplified hydrophobic and oleophobic substance is a potassium fluoroalkyl-sulphonate (for example FC129 from 3M). (See column 5, lines 50–52) FC129 is a potassium fluoroctyl sulphonyl-containing compound.

SUMMARY OF THE INVENTION

The invention relates to optical elements having a surface treatment comprising a fluorochemical having the general structure Rf-[G]$_m$(CH$_2$)$_n$—X wherein Rf is a fluorinated alkyl group, G is a divalent linking group selected from oxygen and sulfonamido, m is an integer ranging from 0 to 1, n is an integer ranging from 2 to 24, and X is a polar group or polar group containing radical.

The invention further relates to reflective articles such as pavement markings, reflective sheeting, and projection screens comprising a binder and the surface treated optical elements of the invention. The optical elements are embedded in the binder surface at a depth of about 40 to 60 percent of their diameters.

DETAILED DESCRIPTION OF THE INVENTION

The present invention relates to optical elements such as glass beads coated with a fluorocarbon surface treatment. The terminology "optical element" refers to a material having a particle size ranging from about 25 to 1000 microns and having a refractive index ranging from about 1.5 to about 2.3 and higher. "Surface treatment" refers to the presence of a fluorochemical comprising a fluorinated alkyl segment, a hydrocarbon segment, and a polar group or polar group containing radical. The presence of such can be detected by means of x-ray photoelectron spectroscopy (XPS) or time of flight secondary ion mass spectroscopy.

The optical elements have at least one dimension that is no larger than 2 millimeters and preferably no larger than 250 microns. The optical elements may be in the form of any shape such as granules, flakes and fibers. However, spheroidal glass elements, denoted as "glass beads", "beads" and "microspheres" hereinafter are preferred for materials such as retroreflective articles (e.g. retroreflective sheetings, pavement marlings and beaded projection screens).

During the manufacture of retroreflective materials, optical elements are fixed in place by means of a liquid binder. Optical elements have a density or specific gravity several times that of the liquid binder, causing the optical elements to sink into the liquid binder layer, rather than float on the surface.

Preferred properties of optical elements will be described herein with respect to glass beads. Ordinary glass beads typically have a density of about 2.5 and a refractive index of about 1.5. "High index" beads refers to beads having a density of about 3.5 and a refractive index of about 1.9, whereas "super high index" typically refers to beads having a density of about 5 and a refractive index of about 2.3 or higher. The diameter of the glass beads typically ranges from a few microns to approximately 2500 microns and is preferably from about 25 to 1000 microns.

In addition to having the desired particle size and refractive index, the glass beads are typically transparent. The term transparent means that when viewed under an optical microscope (e.g., at 100×) the microspheres have the property of transmitting rays of visible light so that bodies beneath the microspheres, such as bodies of the same nature as the microspheres can be clearly seen through the microspheres, when both are immersed in oil of approximately the same refractive index as the microspheres. The outline, periphery or edges of bodies beneath the microspheres are clearly discernible. Although the oil should have a refractive index approximating that of the microspheres, it should not be so close that the microspheres seem to disappear as would be the case for a perfect match.

The optical elements may comprise microspheres that are ceramic. In general, ceramic microsphere optical elements are comprised of metal oxides that are substantially colorless. Suitable metal oxides include $Al_2O_3$, $SiO_2$, $ThO_2$, $SnO_2$, $TiO_2$, $Y_2O_3$ and $ZrO_2$ with the oxides of zirconium, silicon, and titanium being preferred. The ceramic microspheres can exhibit a range of properties, depending on the kind and amounts of the various metal oxides employed as well as the method of manufacture. Preferred, however, are dense microspheres having substantially no open porosity that have an average hardness greater than sand.

Additional information concerning the desired properties for various end-uses and methods of manufacture of microspheres (e.g. sol-gel process), can be found in U.S. Pat. Nos. 3,493,403; 3,709,706; and 4,564,556; incorporated herein by reference. Glass beads suitable for use as optical elements in the invention are also commercially available from Flex-O-Lite Corporation, Fenton, Mo. and Nippon Electric Glass, Osaka, Japan.

The optical elements of the invention are coated with a surface treatment that alters the floatation properties of the optical element in the liquid binder. "Float" and derivations thereof, described in the context of glass beads, refers to the beads assuming a position wherein slightly more than half of each bead is submerged. The liquid binder preferably contacts the embedded beads only up to 5 to 30° above their equators. The floatability of the glass beads can be affected to some extent by the particle size, particle size distribution, surface chemistry and chemical make-up of the particular glass beads as well as the chemical make-up, density, and viscosity of the binder. In general, however, only about 10% or less of the glass beads tend to float in heptane test liquid in the absence of an effective surface treatment.

The position that the glass beads attain relative to the undisturbed binder due to the surface treatment assists the anchoring of the beads in the ultimate dried or solidified binder coating. The glass beads are preferably embedded to about 40–70%, and more preferably to about 40–60% of their diameters. The beads are adequately exposed providing a sphere-lens having a large optical aperture relative to its size. During the drying or solidification of the binder, there is some shrinkage of the binder film. However, the beads remain bonded with the centers of the floated beads being approximately equidistant from the underlying back surface of the binder layer or the top surface of the base.

In addition to the improvement in floatation of the optical elements, it is also important that the surface treatment does not adversely affect the adhesion of the optical elements with the liquid binder. The adhesion can be evaluated in several ways and will be described herein with respect to a preferred optical element, glass beads. The initial adhesion can subjectively determined by estimating the depth to which the embedded glass beads have sunk into the binder after curing. The glass beads are preferably embedded to a depth of about 40–70%, and more preferably to about 40–60% of their diameters. Another way of evaluating adhesion is accelerated aging evaluations. A piece of cured glass bead-embedded binder is conditioned in boiling water for 24 hours. After conditioning, the glass beads are preferably embedded to the same extent as prior to conditioning and the individual glass beads are difficult to remove with a dissection probe. Yet another way to evaluate the effect of the binder on adhesion is comparative tensile testing. A uniform slurry of binder and untreated glass beads at a ratio of about 1 to 3 is drawn down into a film having a thickness of about 0.4 mm. A second slurry of binder and surface treated glass beads employing the same ratio of ingredients and film thickness is prepared. After the samples are fully cured, the samples are conditioned for 24 hours in water at ambient temperature. Tensile testing is conducted with a 1" (2.5 cm) wide sample employing a 2" (5 cm) gap at a rate of 0.5 inches (1.3 cm)/Minute. The stress at break of the sample comprising the surface treated beads is about the same as or preferably greater than the control sample, comprising untreated beads ($\geq$ about 90% of the standard deviation of the average value). Any one of the previously described methods is typically sufficient to determine whether the surface treatment adversely affects the adhesion of the glass beads with the liquid binder. Preferably, however, all three of the evaluations are conducted.

The fluorochemical surface treatments comprise a fluorinated alkyl group, a hydrocarbon segment, and at least one polar group or polar group-containing organic radical. The compounds have the general formula $Rf\text{-}[G]_m(CH_2)_n\text{---}X$ wherein Rf is a fluorinated alkyl group, G is a divalent linking group selected from oxygen (—O—) and sulfonamido (—$SO_2$R—), m is an integer ranging from 0 to 1, n is an integer ranging from 2 to 24, and X is polar group or polar group containing radical. For embodiments wherein G is sulfonamido (—$SO_2$R—), R is preferably a short alkyl group having r carbon atoms wherein r is 1 to 4.

The fluorinated alkyl group is preferably perfluorinated (i.e., all C—H bonds are replaced by C—F bonds). The fluorinated alkyl group typically comprises up to 12 carbon atoms (i.e. y=12) and can include linear, branched, and/or cyclic structures that may be substituted with one or more oxygen atoms. Preferably, the fluorinated alkyl group has less than 12 carbon atoms, more preferably less than 8, even more preferably less than 6 and most preferably 4 carbon atoms.

The hydrocarbon segment typically comprises up to 24 carbon atoms (i.e. m=24). Such hydrocarbon segment is typically linear. Preferably, m is no more than 12 and more preferably no more than 10.

The number of carbon atoms of the fluorinated alkyl group is related to the number of major atoms (C, S, O and N) in the compound (excluding the polar group) by the expression 2y+g+r+n wherein the sum is greater than or equal to 10 and wherein g is the number of chain atoms of G.

A wide variety of polar groups or polar group-containing organic radicals, X, are suitable provided such functional end-group(s) serve an intended purpose of binding the surface treatment to the optical elements and not adversely affecting the adhesion between the binder and the optical elements. Additionally, since the perfluoro tail is hydrophobic, the polar group or polar group-containing organic radical also permits the making of dilute emulsions, solutions, and dispersions for treating the optical elements. The polar group or polar group containing radical may be anionic, nonionic, cationic, or amphoteric. In general, the more commonly employed polar groups or polar group-containing organic radicals for aqueous delivery of the treatment solution include organic acids, particularly carboxylic acids and sulfonic acids; carboxylate salts and esters, sulfonates, ammonium salts, metal salts, hydroxyl, and transition metal complexes. The compound may have any one of these polar groups or polar group-containing organic radicals or any combination thereof. For enhanced water solubility and ease of processing, surface treatments having an acid group are preferably converted to the corresponding salt by neutralization with an appropriate base.

Preferred, however, are fluorochemical derivatives having polar groups or polar group-containing organic radicals that are substantially free of heavy metals and transition metals (trace impurities only). Representative preferred surface treatments include those having polar groups or polar group-containing organic radicals such as sulfonic acids carboxylic acids and salts thereof. The monovalent salts of these acids find particular utility as surfactants.

The fluorochemical derivatives described herein can be prepared with known techniques described in the literature. See for example, U.S. Pat. Nos. 4,140,709 and 5,688,884; and Russian Patent SU 1019798 A. Fluorochemicals having the general formula $Rf(CH_2)nCO_2H$ can be synthesized according to the procedure described in *Journal of Fluorine Chemistr*, 93, 1–25 (1999) and cited references described therein. Some of the derivatives described herein are commercially available as well. For example, a fluorochemical (believed to be $C_6F_{13}CH_2CH_2SO_3H$) is available from Atofina Chemicals, Inc. Philadelphia, Pa. under the trade designation "Forafac 1033D".

The surface treatment is present on the optical elements in an amount sufficient such that greater than about 50% of the optical elements float in heptane. Preferably, the surface treatment improves the floatability such that greater than about 80% of the optical elements float in heptane and more preferably about 90–100% of the optical elements float in heptane.

The amount of fluorochemical derivative employed for coating the optical elements typically ranges from about 5 ppm to about 1000 ppm with respect to the weight of the optical elements. A preferred fluorochemical compound is one that contributes the desired floatation at minimum concentrations. The amount of fluorochemical derivative is usually about 600 ppm or less, preferably about 300 ppm or less, more preferably about 150 ppm, even more preferably about 100 ppm, and most preferably about 50 ppm or less. Typically, the overall coating thickness of the surface treatment of the present invention is greater than about 15 Angstroms, preferably, greater than about 20 Angstroms, and more preferably, greater than about 50 Angstroms. Thicker coatings can be obtained if desired, although it is preferred that the coating thickness be no greater than about 500 Angstroms, more preferably, no greater than about 300 Angstroms, and most preferably, no greater than about 150 Angstroms thick. Excessive concentrations of surface treatment can result in agglomeration of the optical elements. Such limits can be determined by routine experimentation and in some instances the agglomeration can be reduced by the use of flow control agents.

The fluorochemical compositions described herein for use as surface treatment for optical elements are typically solids. The surface treatments are combined with various solvents to form emulsion(s), solution(s) or dispersion(s). The emulsion(s), solution(s), and dispersion(s) are then further diluted in order to deliver the desired concentration. It is assumed that negligible amounts of the diluted surface treatment are lost and substantially all of the surface treatment present in the emulsion, solution or dispersion is deposited on the optical elements. Hence, the concentration (ppm) based on the weight of the optical elements being coated with the emulsion, solution, or dispersion is approximately equal to the amount retained on the optical elements upon evaporation of the solvent. Although aqueous emulsions, solutions, and dispersions are preferred, up to about 50% of a cosolvent such as methanol, isopropanol, or methyl perfluorobutyl ether may be added. Preferably, the aqueous emulsions, solutions, and dispersions comprise less than about 30% cosolvent, more preferably less than about 10% cosolvent, and most preferably the aqueous emulsions, solutions, and dispersions are substantially free of cosolvent. The aqueous surface treatment is coated on the optical elements typically by combining the optical elements with the minimum volume of aqueous surface treatment to uniformly coat the optical elements and then drying the coated elements. Although aqueous delivery is preferred, the surface treatment could also be applied from 100% organic solvent as well as by other techniques such as vapor deposition.

The surface treatment may comprise any one or any mixture of the presently described compounds as well as mixtures of the presently described surface treatment with other known surface treatments.

The optical elements may comprise one or more additional surface treatments such as adhesion promoters and flow control agents that reduce particle agglomeration. Various silanes such as 3-aminopropyltriethoxysilane are commonly employed as adhesion promoters, whereas methacrylato chromic chloride, commercially available from Zaclon Inc, Cleveland, Ohio under the trade designation "Volan" is a typical flow control agent.

The surface treated optical elements of the invention can be employed for producing a variety of reflective products or articles such as pavement markings, retroreflective sheeting, and beaded projection screens. Such products share the common feature of comprising a liquid binder layer and embedding a multitude of optical elements into the binder surface followed by solidifying the binder to retain the optical elements in place. In the pavement markings, retroreflective sheeting, and beaded projection screens of the invention, at least a portion of the optical elements will comprise the surface treated optical elements of the invention. Typically, the majority of, and preferably substantially all, the optical elements employed in the manufacture of the reflective products will comprise the surface treated optical elements of the invention.

Various known binder materials may be employed including various one and two-part curable binders, as well as thermoplastic binders wherein the binder attains a liquid state via beating until molten. Common binder materials include polyacrylates, methacrylates, polyolefins, polyurethanes, polyepoxide resins, phenolic resins, and polyesters. For reflective paints the binder may comprise reflective pigment. For reflective sheeting, however, the binder is typically transparent. Transparent binders are applied to a reflective base or may be applied to a release-coated support, from which after solidification of the binder, the beaded film is stripped and may subsequently be applied to a reflective base or be given a reflective coating or plating.

There are several types of retroreflective articles in which the surface treated optical elements may be used such as exposed lens (e.g. U.S. Pat. Nos. 2,326,634 and 2,354,018), embedded lens (e.g. U.S. Pat. No. 2,407,680), and encapsulated lens (e.g. U.S. Pat. No. 4,025,159) retroreflective sheeting. Retroreflective articles can be prepared by known methods including a method comprising the steps of: (i) forming a top coat on a release coated web (e.g. coating a solution of hydroxy-functional acrylic polyol and aliphatic polyfuntional isocyanate onto a release-coated paper web and then curing by conveying the coating through an oven at about 150° C. for about 10 minutes); (ii) coating the exposed surface of the top coat with a liquid binder (e.g. coating a solution comprising an oil-free synthetic polyester resin and a butylated melamine resin); (iii) drying the binder to form an uncured tacky bead-bond layer; (iv) cascade-coating onto the bead-bond layer a plurality of glass microspheres forming a monolayer of embedded glass microspheres; (v) curing the bead-containing bead-bond layer to a non-tacky state (e.g. by heating to 150° C.); forming a space coat layer over the bead-containing bead-bond layer (e.g. coating a 25% solids solution comprised of a polyvinylbutyral resin and a butylated melamine resin in a solvent and curing at 170° C. for about 10 minutes); (vi) applying a reflective layer over the space coat layer (e.g. vapor deposition of aluminum metal at a thickness of about 100 nm); and stripping away the release-coated web. An adhesive layer is typically applied to the reflective layer (e.g. by coating a 0.025 mm thick layer of an aggressive acrylic pressure-sensitive adhesive onto a silicone-treated release liner and pressing the adhesive against the reflective layer).

The surface treated optical elements are also useful in pavement marking materials. The optical elements can be incorporated into coating compositions that generally comprise a film-forming material having a multiplicity of optical elements dispersed therein. The surface treated optical elements may also be used in drop-on applications for such purposes as highway lane striping in which the optical elements are simply dropped onto wet paint or hot thermoplastic and adhered thereto.

One typical pavement marking sheet is described in U.S. Pat. No. 4,248,932. This sheet material is a prefabricated strip adapted to be laid on and secured to pavement for such purposes as lane dividing lines and comprises a base sheet, such as a soft aluminum foil which is conformable to a roadway surface; a top layer (also called the support film or binder film) adhered to one surface of the base sheet and being very flexible and resistant to rupture; and a monolayer of surface treated optical elements such as transparent microsphere lens elements partially embedded in the top layer in a scattered or randomly separated manner. The pavement marking sheet construction may also include an adhesive (e.g., pressure sensitive, heat or solvent activated, or contact adhesive) on the bottom of the base sheet. The base sheet may be made of an elastomer such as acrylonitrile-butadiene polymer, polyurethane, or neoprene rubber. The top layer in which the surface treated microspheres are embedded is typically a polymer such as vinyl polymers, polyurethanes, epoxies, and polyesters. Alternatively, the surface treated microsphere lenses may be completely embedded in a layer of the pavement marking sheet.

Pavement marking sheets may be made by processes known in the art (see e.g. U.S. Pat. No. 4,248,932), one example comprising the steps of: (i) coating onto a base sheet of soft aluminum (50 micrometers thick) a mixture of resins (e.g., epoxy and acrylonitrile butadiene elastomer mixture), pigment (TiO$_2$) and solvent (e.g., methyl ethyl ketone) to form the support film; (ii) dropping onto the wet surface of the support film ingredients a multiplicity of the surface treated optical elements of the invention; and curing the support film at 150° C. for about 10 minutes. A layer of adhesive is then usually coated on the bottom of the base sheet.

Pigments or other coloring agents may be included in the top layer in an amount sufficient to color the sheet material for use as a traffic control marking. Titanium dioxide will typically be used for obtaining a white color; whereas, lead chromate will typically be used to provide a yellow color.

A rear projection screen is a sheet-like optical device having a relatively thin viewing layer that is placed at an image surface of an optical projection apparatus. Rear projection screen displays comprising glass microspheres embedded in an opaque matrix are known from U.S. Pat. No. 2,378,252, for example. Generally, the size of the microspheres is less than about 150 microns. For maximum brightness, the microspheres have an index of refraction of less than about 1.8 and preferably from about 1.45 to about 1.75. A plurality of the surface treated glass microspheres are attached to and are in intimate contact with a major surface of a transparent substrate. Alternatively, a diffusion layer can be formed by coating an optically inhomogeneous material as a separate layer onto the transparent substrate prior to application of the opaque binder and microspheres. Rear projection screens are prepared by i) providing a substrate (e.g. polyester, polycarbonate) having an opaque binder disposed thereon (e.g. acrylate loaded with carbon black to make it opaque); and ii) applying the surface treated glass microspheres under conditions effective to produce microspheres in optical contact with the substrate and embedded in the opaque matrix.

In some useful embodiments of the invention, a specular reflective means is provided by a layer of metal (e.g. aluminum) vapor-eposited on the surface treated microspheres. Another useful specular reflective means is a dielectric reflector which comprises one or more layers of a transparent material behind the microspheres, each layer having a refractive index of about 0.3 higher or lower than that of the adjacent layer or beads and each layer having an optical thickness corresponding to an odd numbered multiple of about ¼ wavelength of light in the visible range. More detail on such dielectric reflectors is found in U.S. Pat. No. 3,700,305.

The invention is further illustrated by the following examples.

Test Methods

1. Heptane Floatation—A single layer of optical elements was spread on a clean inverted pint paint can lid. Heptane was slowly introduced with a syringe or dropper at the edge of the lid until it overflows. The percentage of optical elements floating was estimated visually. In the absence of indicating otherwise, the beads were tested within 24 hours of being coated with the surface treatment.

2. Initial Adhesion—A polyurethane liquid binder having the following components was prepared:

27 parts Rutile titanium dioxide pigment (commercially available from Du Pont, New Johnsonville, Tenn. under the trade designation "Tipure R-960")

25 parts polyester polyol (commercially available from Union Carbide Corp., Danbury, Conn. under the trade designation "Tone 0301")

50 parts aliphatic polyisocyanate (commercially available from Bayer Corp., Pittsburgh, Pa. under the trade designation "Desmodur N-100")

The binder was drawn down on a paper liner at thickness of 30 mils. Immediately thereafter, a plurality of the indicated glass beads were sprinkled over the binder, maximizing the number of adhered beads per surface area of binder. The bead coated binder was then cured in an oven (100° C. for 30 minutes is typically sufficient for the polyurethane binder). The bead-coated binder film was examined under a microscope. The sample passes when the optical elements are embedded to about 40–80% of their diameters. Preferably the optical elements are embedded to about 40–70% of their diameters.

3. Accelerated Aging Adhesion—A ¼" (0.6 cm) by 1" (2.5 cm) piece of cured bead-coated binder film, prepared for the Initial Adhesion Test, is placed in a flask of boiling water for 24 hours. The aged sample is then inspected under a microscope to determine whether the optical elements remain embedded. The sample passes when the sample appears approximately the same as the initial sample and the beads are difficult to remove with a dissection probe.

4. Coefficient of Retroreflection (RA), in cd/Lux/m$^2$, was measured at an entrance angle of −4.0 degrees and an observation angle of 0.2° according to Procedure B of ASTM Standard E 809-94a The photometer used for the measurements is described in U.S. Defensive Publication No. T987,003.

Preparation of the Fluorochemicals

The surface treatments having the structure Rf(CH$_2$) nCO$_2$H can be synthesized according to the procedure described in *Journal of Fluorine Chemistry*, 93, 1–25 (1999) and cited references described therein.

Preparation of Chromium Hydroxy Dichloride

Into a beaker was placed 26.6 g of CrCl$_3$·6H$_2$O (0.1mol), 193 ml of water. The chromium trichlroide rapidly dissolved in the water. To the solution was slowly added 13.3 g (1 equivalent) of 10 molal NaOH diluted with 100 mL of water. After addition, the solution was stirred at room temperature overnight, giving the desired chromium hydroxy dichloride aqueous solution.

Preparation of $C_8F_{17}(CH_2)_{10}CO_2Cr(OH)C_{12}$

Into a beaker was placed 16.8 g of the above-prepared chromium hydroxy dichloride solution (0.005 mol); in a separate beaker was prepared a solution of $C_8F_{17}(CH_2)$ 10CO$_2$H (0.004 mol, 2.42g) in 30 g of isopropanol. To the aqueous solution was slowly added the F-acid/isopropanol solution. Some precipitate appeared during the initial addition. After addition, the solution was stirred at room temperature for ca. 2 hr. Finally, to the solution was added 40 g of isopropanol and 0.3 g of perfluorobutyric acid, and the solution was stirred at room temperature overnight. A clear dark-green solution was obtained.

Preparation of $C_4F_9(CH_2)_{10}CO_2Cr(OH)C_{12}$

Into a beaker was placed 33.6 g of the above-prepared chromium hydroxy dichloride solution (0.010 mol); in a separate beaker was prepared a solution of $C_4F_9(CH_2)$ 10CO$_2$H (0.00953 mol, 3.84 g) in 80 g of isopropanol. To the aqueous solution was slowly added the F-acid/isopropanol solution. Some precipitate appeared during the initial addition. After addition, the solution was stirred at room temperature for ca. 2 hr. Finally, to the solution was added 40 g of isopropanol and 0.2 g of perfluorobutyric acid, and the solution was stirred at room temperature overnight. A clear dark-green solution was obtained.

Preparation of $C_4F_9(CH_2)_5CO_2Cr(OH)C_{12}$

Into a beaker was placed 33.6 g of the above-prepared chromium hydroxy dichloride solution (0.010 mol); in a separate beaker was prepared a solution of $C_4F_9(CH_2)$ 5CO$_2$H (0.021 mol, 6.6 g) in 80 g of isopropanol. To the aqueous solution was slowly added the F-acid/isopropanol solution. Some precipitate appeared during the initial addition. After addition, the solution was stirred at room temperature for ca 2 hr. Finally, to the solution was added 40 g of isopropanol and 0.2 g of perfluorobutyric acid, and the solution was stirred at room temperature overnight. A clear dark-green solution was obtained.

Preparation of $C_4F_9O(CH_2)_4SO_3H$

In a 600 ml PARR stainless steel reactor, the following materials were charged: 130 g diglyme, 8 g adogen 464, 39.8 KF, 130 g normal-perfluorobutyl acid fluoride (90% purity), and 100 g butane sultone. The reactor was heated to 75° C. and held at temperature for 70 hours. The reaction mixture was then cooled to recover 184 g of product after treatment with KOH and extraction with toluene. The product was analyzed by NMR to identify its structure as being n-$C_4F_9OC_4H_8SO_3K$ with a purity of 92%. The sulfonic acid salt was converted to the corresponding acid by acidification with H2SO4.

Preparation of $(CF_3)_2CFCF_2O(CH_2)_4SO_3$

In a 600 ml PARR stainless steel reactor, the following materials were charged: 110 g diglyme, 7 g adogen 464, 35 KF, 175 g iso-perfluorobutyl acid fluoride (70% purity), and 73 g butane sultone. The reactor was heated to 75° C. and held at temperature for 70 hours. The reaction mixture was then cooled to recover 106 g of product after treatment with KOH and extraction with toluene. The product was analyzed by NMR to identify its structure as being i-$C_4F_9OC_4H_8SO_3K$. The sulfonic acid salt was converted to the corresponding acid by acidification with $H_2SO_4$.

Optical Elements

The reflective glass beads employed to evaluate the effectiveness of the surface treatment of the invention had an index of refraction of 1.75 and an average diameter of 200 microns and were prepared according to the teaching of U.S. Pat. No. 4,564,556. Such beads are representative of optical elements commonly used for reflective paint (e.g. pavement markings).

For each of the examples the optical elements were surface treated by charging a 25 g sample of the beads into a round-bottom flask. A sufficient amount (8–10 ml) of the indicated solvent (water, about 2:1 blend of water and isopropanol) was added to cover and wet out the beads. The indicated fluorochemical (e.g. fluorinated (poly)urethane, fluorinated polyester, fluorinated polyphosphate) was then added as a dilute solution in an amount to provide the desired treatment level based on the weight of the reflective beads. The treated beads were dried in a forced air oven at 120° C. for 30 to 60 minutes. The dried beads were tested according to the Heptane Floatation Test, as previously described.

For Examples 1–15, the beads were treated with the fluorochemical surface treatment indicated in column 1 of Table I at the concentration indicated in column 3. The surface treated beads were tested according to the Heptane Floatation test, as previously described, with the results reported in column 4 of Table I.

TABLE I

| Example | Fluorochemical | Solvent | ppm | % Float |
|---|---|---|---|---|
| 1 | $C_4F_9(CH_2)_{10}CO_2H$ | H$_2$O/isopropanol | 70 | 100 |
| 2 | $C_4F_9(CH_2)_5CO_2H$ | H$_2$O/isopropanol | 100 | 100* |

TABLE I-continued

| Example | Fluorochemical | Solvent | ppm | % Float |
|---|---|---|---|---|
| 3 | $C_8F_{17}(CH_2)_{10}CO_2H$ | $H_2O$/isopropanol | 70 | 100 |
| 4 | $C_4F_9(CH_2)_{10}CO_2Cr(OH)C_{12}$ | $H_2O$/isopropanol | 250 | 100 |
| 5 | $C_4F_9(CH_2)_5CO_2Cr(OH)C_{12}$ | $H_2O$/isopropanol | 250 | 100 |
| 6 | $C_8F_{17}(CH_2)_{10}CO_2Cr(OH)C_{12}$ | $H_2O$/isopropanol | 250 | 100 |
| 7 | $(CF_3)_2CFCF_2O(CH_2)_4SO_3NH_4$ | $H_2O$ | 150 | 85 |
| 8 | $(HFP)_3O(CH_2)_4OH$ | $H_2O$/isopropanol | 200 | 100 |
| 9 | $C_4F_9(CH_2)_{10}CO_2Me$ | $H_2O$/isopropanol | 250 | 85 |
| 10 | $C_4F_9(CH_2)_{10}CH_2OH$ | $H_2O$/isopropanol | 250 | 70 |
| 11 | $C_4F_9SO_2N(CH_3)CH_2CH_2OH$ | $H_2O$/isopropanol | 200 | 95 |
| 12 | "Forafac 1033D" | $H_2O$ | 100 | 100 |
| 13 | $C_4F_9O(CH_2)_4SO_3H$ | $CH_3OH$ | 500 | 100 |
| 14 | $C_4F_9O(CH_2)_4SO_3H$ | $CH_3OH$ | 100 | 100 |
| 15 | $(CF_3)_2CFCF_2O(CH_2)_4SO_3H$ | $CH_3OH$ | 100 | 100 |

*Predicted result.

Adhesion testing was conducted on the glass beads surface treated with Forafac 1033D. The glass beads were pretreated with 600 ppm of 3-aminopropyltriethoxysilane commercially available from OSI Specialties, Danbury, Conn. under the trade designation "Silquest A-1100". The beads were coated at the treatment level indicated in column 2 in the manner previously described. Table II depicts the % Float, Initial Adhesion, Accelerated Aging Adhesion, and the Coefficient of Retroreflection (RA).

TABLE II

| Surface Treatment | Loading (ppm) | % Float | Initial Adhesion (%) | Accelerated Aging (pass/fail) | RA (cd/lux/m²) |
|---|---|---|---|---|---|
| Control* (none) | 0 | 0 | ~95 | ** | 0.4 |
| Control (none) | 0 | 0 | ~95 | ** | 0.5 |
| Forafac 1033D | 50 | 95–100 | ~40–50 | Pass | 4.5 |
| Forafac 1033D | 75 | 95–100 | ~40 | Pass | 4.4 |
| Forafac 1033D | 100 | 95–100 | ~30–40 | Pass | 4.0 |

*no "Silquest A-1100"
**Could not be determined since the beads were embedded to 95%

The results show that the untreated glass beads as well as the beads that were only treated with the Silquest A-1100 did not float in heptane, nor the binder. Accordingly, RA was very low since very few beads were present on the binder surface. By further treating the glass beads with the Forafac 1033D, the float in heptane improved to 95–100%. The Heptane Floatation results con-elated with the float testing in the binder as well allowing for the beads to be adhered at a sink depth of 30–50% of the diameter of the beads. The proper floatation in the binder is also reflected in the improved RA.

What is claimed is:

1. Optical elements having a surface treatment comprising a fluorochemical having the general structure $Rf-[G]_m(CH_2)_n-X$ wherein Rf is a fluorinated alkyl group, G is a divalent linking group selected from oxygen and sulfonamido, m is an integer ranging from 0 to 1, n is an integer ranging from 2 to 24, and X is a polar group or polar group containing radical.

2. The optical elements of claim 1 wherein Rf comprises up to 12 carbon atoms.

3. The optical elements of claim 1 wherein Rf comprises at least 2 carbon atoms.

4. The optical elements of claim 2 wherein Rf has no more than 8 carbon atoms.

5. The optical elements of claim 2 wherein Rf has no more than 6 carbon atoms.

6. The optical elements of claim 2 wherein Rf has no more than 4 carbon atoms.

7. The optical elements of claim 1 wherein n is no more than 12.

8. The optical elements of claim 1 wherein n is no more than 10.

9. The optical elements of claim 1 wherein n is at least 4.

10. The optical elements of claim 2 wherein X is selected from the group consisting of carboxylic acids and sulfonic acids; carboxylate salts and esters, sulfonates, ammonium salts, metal salts, hydroxyl, and transition metal complexes.

11. The optical elements of claim 1 wherein the percent float in heptane is at least about 90%.

12. A pavement marking comprising a liquid binder and a multitude of the optical elements according to claim 1.

13. The pavement marking of claim 12 wherein the optical elements are embedded in the binder at a depth of about 40–70% of their diameters.

14. A reflective sheeting comprising:
 a) a top coat layer having an exposed surface;
 b) a binder layer disposed on the exposed surface of the top coat layer; and
 c) a multitude of optical elements according to claim 1 disposed in the binder layer;
 d) a space coat layer disposed on the binder layer; and
 e) a reflective layer disposed on the space coat layer.

15. The reflective sheeting of claim 14 wherein the optical elements are embedded in the binder at a depth of about 40–70% of their diameters.

16. A rear projection screen comprising a transparent substrate and a multitude of optical elements according to claim 1 embedded in an opaque binder matrix and wherein said optical elements are in contact with the transparent substrate.

17. The rear projection screen of claim 16 wherein the optical elements are embedded in the binder at a depth of about 40–70% of their diameters.

* * * * *

UNITED STATES PATENT AND TRADEMARK OFFICE
CERTIFICATE OF CORRECTION

PATENT NO.      : 6,905,754 B2
DATED           : June 14, 2005
INVENTOR(S)     : Jing, Naiyong It is certified that error appears in the above-identified patent and that said Letters Patent is hereby corrected as shown below:

Title page,
Item [56], References Cited, U.S. PATENT DOCUMENTS, "2,642,416" reference, delete "Ahibrecht et al." and insert -- Ahlbrecht et al. --, therefor.
OTHER PUBLICATIONS, "Forafac 1033D," reference, delete "Safely" and insert -- Safety --, therefor.

Column 2,
Line 49, delete "marlings" and insert -- markings --, therefor.

Column 3,
Line 2, delete "100x" and insert -- 100X --, therefor.

Column 5,
Line 27, delete "Chemistr" and insert -- Chemistry --, therefor.

Column 6,
Line 56, delete "beating" and insert -- heating --, therefor.

Column 8,
Line 35, delete "vapor-eposited" and insert -- vapor-deposited --, therefor.

Column 9,
Line 21, after "E 809-94a" insert -- . --.

Column 10,
Line 5, after "ca" insert -- . --.
Line 21, delete "$_4SO_3$" and insert -- $_4SO_3H$ --, therefor.

UNITED STATES PATENT AND TRADEMARK OFFICE
CERTIFICATE OF CORRECTION

PATENT NO.    : 6,905,754 B2
DATED         : June 14, 2005
INVENTOR(S)   : Jing, Naiyong It is certified that error appears in the above-identified patent and that said Letters Patent is hereby corrected as shown below:

<u>Column 11,</u>
Line 52, delete "con-elated" and insert -- correlated --, therefor.

Signed and Sealed this

Twenty-third Day of August, 2005

JON W. DUDAS
*Director of the United States Patent and Trademark Office*